(12) United States Patent
West et al.

(10) Patent No.: US 11,100,594 B1
(45) Date of Patent: Aug. 24, 2021

(54) CORRELATING RESOURCE USAGE DATA TO A WASTE SCORING SYSTEM

(71) Applicant: Vivint, Inc., Provo, UT (US)

(72) Inventors: Dallin West, Provo, UT (US); Jeffrey David Whitlock, Provo, UT (US); Ryan Beck, Bountiful, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 16/553,062

(22) Filed: Aug. 27, 2019

Related U.S. Application Data

(63) Continuation of application No. 15/098,576, filed on Apr. 14, 2016, now Pat. No. 10,395,322.

(51) Int. Cl.
*G06Q 50/00* (2012.01)
*A63F 13/46* (2014.01)

(52) U.S. Cl.
CPC ............. *G06Q 50/01* (2013.01); *A63F 13/46* (2014.09)

(58) Field of Classification Search
CPC ................................. G06Q 50/01; A63F 13/46
See application file for complete search history.

(56) References Cited

U.S. PATENT DOCUMENTS

| | | | |
|---|---|---|---|
| 8,660,868 B2 | 2/2014 | Vogel et al. | |
| 2005/0021389 A1* | 1/2005 | Dias | G06Q 40/02 |
| | | | 705/7.39 |
| 2010/0082499 A1* | 4/2010 | Luff | G06Q 10/04 |
| | | | 705/317 |
| 2010/0289652 A1* | 11/2010 | Javey | H04Q 9/00 |
| | | | 340/605 |
| 2011/0137763 A1 | 6/2011 | Aguilar | |
| 2012/0095794 A1 | 4/2012 | Guthridge | |
| 2012/0150733 A1 | 6/2012 | Belady et al. | |
| 2012/0185304 A1 | 7/2012 | Belady et al. | |
| 2013/0066897 A1* | 3/2013 | Ehrenberg | G06Q 10/10 |
| | | | 707/769 |
| 2014/0012552 A1* | 1/2014 | Zik | G06Q 10/10 |
| | | | 703/2 |
| 2014/0371935 A1* | 12/2014 | Kamel | G05B 15/02 |
| | | | 700/291 |
| 2017/0270621 A1* | 9/2017 | Fleming | G06Q 50/06 |

FOREIGN PATENT DOCUMENTS

WO     2002027621 A1    4/2002

* cited by examiner

*Primary Examiner* — Marc Anthony Armand
(74) *Attorney, Agent, or Firm* — Holland & Hart, LLP

(57) ABSTRACT

A method for correlating energy usage data and water usage data to a waste scoring system is described. In one embodiment, the method includes receiving energy usage data and water usage data from a plurality of users, identifying at least one user group from the plurality of users based on predetermined parameters, and calculating average energy usage and average water usage for each of the user groups. The energy usage data and water usage data received for an individual user may then be compared to the calculated average energy usage and calculated average water usage for at least one of the user groups, and a general waste score may be calculated for the individual user. In some cases, a plurality of sub-waste scores may be calculated indicating factors of energy usage and factors of water usage for the individual user.

20 Claims, 7 Drawing Sheets

CORRELATING RESOURCE USAGE DATA TO A WASTE SCORING SYSTEM

CROSS-REFERENCE TO RELATED APPLICATIONS

The present application is a continuation of U.S. patent application Ser. No. 15/098,576, titled: "CORRELATING RESOURCE USAGE DATA TO A WASTE SCORING SYSTEM" filed Apr. 14, 2016, the disclosure of which is incorporated by reference herein in its entirety.

BACKGROUND

Many consumers are concerned with being "green" and eco-friendly, and are frustrated by wasteful energy and resource usage, particularly in their homes. Yet a clear categorization of energy and resource usage is lacking. While monthly bills often list overall electricity or water usage, no current means are provided for comparing one household's electricity and water usage to the average usage across a multitude of other households of comparable size and occupancy on a real-time basis such that consumers may gauge their own wastefulness as compared to their neighbors.

SUMMARY

Existing smart home sensor systems may be used to gather information relating to all customers having participating smart home sensor systems, the information including occupancy, HVAC usage, water usage, electricity usage, location, etc., and a central database may be maintained and continuously updated based on this data to provide benchmark or average energy usage data and resource usage data based on home size and occupancy.

One aspect of the invention relates to systems, methods and related devices for using this benchmark data to provide a "waste score" to individual users to indicate how their household energy and resource usage compares to the average for households of comparable size and occupancy. These waste scores can be broken out into subcategories to demonstrate how the individual user's household usage compares to the benchmark data in various areas of energy consumption, such as water consumption and electricity consumption. These subcategories can be further broken down into individual factors, such as sprinkler impact and home water impact for water consumption, and HVAC impact and lights/appliances/devices impact for electricity consumption.

Based on the calculated waste score, consumers may then be able to adjust their energy consumption in a targeted manner, such that they are able to lower their waste score to zero, or even earn a negative waste score, meaning that they are actually conserving more energy than the average home of their size. For example, a user may have a combined waste score of 7 out of a possible 10 (where 1 is a good waste score and 10 is a bad waste score). The overall waste score of 7 may be calculated based on averaged sub-category waste scores of 9 in water consumption and 6 in electricity consumption. On this basis, the consumer may elect to continue his electricity consumption habits, but may choose to improve upon his water consumption habits, or alternatively may choose to prioritize reforming his water consumption habits over reforming his electricity consumption habits, while improving upon both.

Participation in waste score improvement amongst users may be encouraged through waste score gamification, for example by allowing users to challenge neighbors to achieve lower waste scores, or by awarding users titles or prizes based on achieving superior waste scores as compared to their neighbors. Waste scores may also be used for lead generation purposes. For example, a waste score subcategory may indicate that a consumer is using twice as much water as his neighbors, and accordingly a particular low-flow sprinkler system may be recommended to the consumer for purchase. The system may further provide the option of facilitating this purchase.

The calculated waste score may be updated in real-time based on changing usages amongst both the individual user and the plurality of users to which the individual user's usage is compared. For example, if a consumer increases the temperature on a thermostat or increases the timer for a sprinkler system, the user's smart home panel or smart phone may display an updated waste score on the basis of this increased usage. In another example, if a geographical area experiences a heat wave, average HVAC usage may increase across the plurality of users, and the average usage may increase, such that the individual user's HVAC usage may be compared to the higher user average in determining a waste score. Additionally, waste scores may be calculated based on either historical or futuristic usage. Specifically, a current waste score may be calculated based on energy usage from the previous week or month, or alternatively a predictive waste score may be provided based on current or hypothetical future energy and resource usage settings.

In an alternative embodiment, a waste score may be calculated based on the weight, frequency of use, and/or utilized capacity of a consumer's garbage receptacle. An optical sensor on the lid and/or a weighing mechanism placed under or integrated with the garbage receptacle may monitor frequency of emptying, capacity usage, and/or weight of contents of the garbage receptacle to determine a waste score as compared to comparable households and their average recorded waste.

Accordingly, the present disclosure may provide a method for correlating energy usage data and water usage data to a waste scoring system. The method may include receiving energy usage data and water usage data from a plurality of users; identifying at least one user group from the plurality of users based on predetermined parameters; calculating average energy usage and average water usage for each of the user groups, the average energy usage and the average water usage being calculated based at least in part on the energy usage data and water usage data received from the plurality of users; comparing energy usage data and water usage data received for an individual user with the calculated average energy usage and the calculated average water usage for at least one of the user groups; calculating a general waste score for the individual user based at least in part on the comparing; and calculating a plurality of sub-waste scores for factors of energy usage and factors of water usage, an average of the sub-waste scores being equal to the general waste score.

In some embodiments, the method may further include continuously updating the calculated general waste score and calculated plurality of sub-waste scores based at least in part on continuously receiving the energy usage data and the water usage data for the individual user or the plurality of users, or a combination thereof.

In some embodiments, the method may further include communicating the calculated general waste score and the calculated plurality of sub-waste scores to the individual user, wherein the calculated general waste score and the calculated plurality of sub-waste scores are displayed on any of a smart home panel, a personal computer, a dedicated application, a webpage, a smart phone, or a combination thereof.

In some embodiments, the factors of water usage may include sprinkler impact and home water impact, and the factors of energy usage may include natural gas consumption and HVAC, lights, device, and appliances impact.

In some embodiments, the method may further include providing the individual user with recommendations for improving the calculated general waste score and the calculated plurality of sub-waste scores.

In some embodiments, providing the user with recommendations for improving the calculated general waste score and the calculated plurality of sub-waste scores may include providing the user with purchasing information for any one of replacement appliances, nozzles, faucets, light bulbs, fixtures, and HVAC components, or a combination thereof.

In some embodiments, the general waste score and the plurality of sub-waste scores may be calculated on a scale of 1 to 10, wherein 1 indicates energy usage and/or water usage well below the calculated average energy usage and the calculated average water usage for the at least one user group, and 10 indicates the energy usage and/or the water usage well above the calculated average energy usage data and the calculated average water usage data for the at least one user group.

In some embodiments, the method may further include providing recognition to users within the at least one user group having any one of a superior general waste score and a superior sub-waste score, wherein the recognition may be any one or more of a title, coupon, or prize.

In some embodiments, the method may further include receiving garbage receptacle usage data from the plurality of users; identifying at least one user group from the plurality of users based on the predetermined parameters; calculating average garbage receptacle usage for each of the user groups, the average garbage receptacle usage being calculated based at least in part on the garbage receptacle usage data received from the plurality of users; comparing garbage receptacle usage data received for an individual user with the calculated average garbage receptacle usage for at least one of the user groups; and calculating a general waste score for the individual user based at least in part on the comparing.

In some embodiments, the predetermined parameters for identifying the at least one user group from the plurality of users may include any one of home size, occupancy, and location, or a combination thereof.

The present disclosure may also relate to an apparatus for correlating energy usage data and water usage data to a waste scoring system. In some embodiments, the apparatus may include a receiver for receiving energy usage data and water usage data from a plurality of users; and a processor for identifying at least one user group from the plurality of users based on predetermined parameters; calculating average energy usage and average water usage for each of the user groups, the average energy usage and the average water usage being calculated based at least in part on the energy usage data and water usage data received from the plurality of users; comparing energy usage data and water usage data received for an individual user with the calculated average energy usage and the calculated average water usage for one of the user groups; calculating a general waste score for the individual user based at least in part on the comparing; and calculating a plurality of sub-waste scores for factors of energy usage and factors of water usage, the average of the sub-waste scores being equal to the general waste score.

The present disclosure is also related to a non-transitory computer-readable medium storing computer-executable code, the code executable by a processor to receive energy usage data and water usage data from a plurality of users; identify at least one user group from the plurality of users based on predetermined parameters; calculate average energy usage and average water usage for each of the user groups, the average energy usage and the average water usage being calculated based at least in part on the energy usage data and water usage data received from the plurality of users; compare energy usage data and water usage data received for an individual user with the calculated average energy usage and the calculated average water usage for one of the user groups; calculate a general waste score for the individual user based at least in part on the comparing; and calculate a plurality of sub-waste scores for factors of energy usage and factors of water usage, the average of the sub-waste scores being equal to the general waste score.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION

The accompanying drawings illustrate a number of exemplary embodiments and are a part of the specification. Together with the following description, these drawings demonstrate and explain various principles of the instant disclosure.

Figure 1:
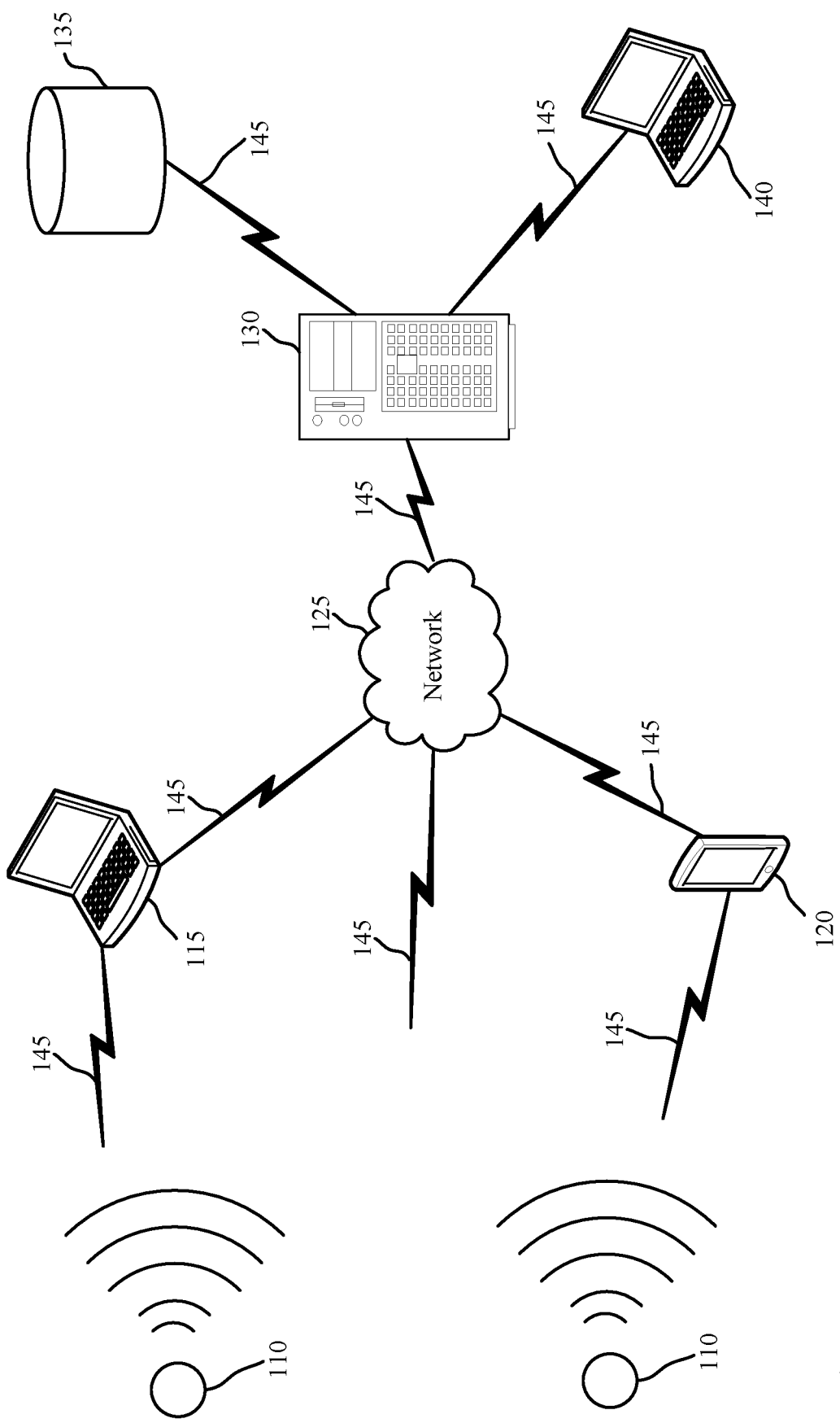
FIG. 1 is a block diagram illustrating one example of a waste scoring system in accordance with various embodiments.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to correlating energy usage data and water usage data to a waste scoring system. More specifically, the systems and methods described herein compare energy usage data and water usage data for individual users to average energy usage and average water usage collected from a plurality of users in order to calculate a general waste score and a plurality of sub-waste scores for the individual user comparing his energy usage and water usage to that of his neighbors'.

In one example, a user may desire to know how his water usage and energy usage compares to the water and energy consumed by other users having similar home sizes or occupancy. For instance, a user may wish to know whether his electricity consumption, and in particular his HVAC system use, is greater or less than that of his neighbors' having comparable home sizes and occupancies. Presently, the user may have no means of breaking down his electricity consumption so specifically, and may instead only receive a general bill at the end of each month indicating the costs associated with his overall electricity consumption. Further, the user may have no way of knowing what other customers having comparable home sizes and occupancies are using in terms of electricity. The present systems and methods provide the means for presenting users with details regarding home energy usage, broken down into subcategories such as water consumption and electricity consumption, and further broken down into individual contributors such as sprinkler impact and HVAC impact. Further, the present systems and methods provide the means for reporting to individual users how their energy consumption compares to that of other users having comparable home sizes and occupancies, so that individual users may gauge their energy and resource consumption and set targeted goals for improving upon their "greenness."

FIG. 1 is a block diagram illustrating one embodiment of a waste scoring system 100 in which the present systems and methods may be implemented. In some embodiments, the waste scoring system 100 may include one or more sensor units 110, local computing device 115, 120, network 125, server 130, central database 135, and remote computing device 140. One or more sensor units 110 may communicate via wired or wireless communication links 145 with one or more of the local computing device 115, 120 or network 125. The network 125 may communicate via wired or wireless communication links 145 with the central database 135 and the remote computing device 140 via server 130. In alternate embodiments, the network 125 may be integrated with any one of the local computing device 115, 120, server 130, or remote computing device 140, such that separate components are not required.

Waste scoring system 100 may be operable to both collect home energy usage data and water usage data from individual users via one or more sensor units 110, and to compile home energy usage data and water usage data for a plurality of users, stored in central database 135.

Sensor units 110 may be coupled to existing smart home systems (not shown), or may be coupled directly to individual home energy usage and water usage systems. For example, sensor units 110 may be coupled directly to or may be integrated with HVAC systems, sprinkler systems, water heaters, appliances, devices, fixtures, and wall plugs. In some embodiments, sensor units 110 collecting energy usage data and water usage data from a plurality of systems or fixtures may be operable to disambiguate incoming data in order to identify individual contributors to resource usage data. For example, a sensor unit 110 coupled to a home breaker box may be operable to identify portions of energy usage attributable to individual appliances or systems in the home such that the user may be presented with specific energy usage data.

Local computing device 115, 120 and remote computing device 140 may be custom computing entities configured to interact with sensor units 110 via network 125, and in some embodiments, via server 130. In other embodiments, local computing device 115, 120 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smart phone, a mobile phone, a personal digital assistant (PDA), and/or any other suitable device operable to send and receive signals, store and retrieve data, and/or execute modules. In still other embodiments, local computing device 115, 120 may be a smart home system panel, for example an interactive panel mounted on a wall in a user's home. Although defined as a smart home system, the local computing device 115, 120 may alternatively comprise a smart business system or any other system operable to monitor and control parameters for buildings or properties.

The local computing devices 115, 120 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115, 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensor units 110.

The processor of the local computing devices 115, 120 may be operable to control operation of the output of the local computing devices 115, 120. The output may be a television, a liquid crystal display (LCD) monitor, a cathode ray tube (CRT) monitor, speaker, tactile output device, and/or the like. In some embodiments, the output may be an integral component of the local computing devices 115, 120. Similarly stated, the output may be directly coupled to the processor. For example, the output may be the integral display of a tablet and/or smart phone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 to the output.

The remote computing device 140 may be a computing entity operable to enable a remote user to monitor the output of the sensor units 110. The remote computing device 140 may be functionally and/or structurally similar to the local computing devices 115, 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via communication links 145 and server 130.

In some embodiments, the one or more sensor units 110 may be sensors configured to conduct periodic or ongoing automatic measurements related to energy usage and water usage data. Each sensor unit 110 may be capable of sensing multiple resource consumption parameters, or alternatively, separate sensor units 110 may monitor separate resource consumption parameters. For example, one sensor unit 110 may measure water usage, while another sensor unit 110 (or, in some embodiments, the same sensor unit 110) may detect electricity usage. In some embodiments, one or more sensor units 110 may additionally monitor alternate resource usage parameters, such as natural gas consumption. Sensor units 110 may monitor a variety of resource usage contributors, such as home appliances, which may include a refrigerator, oven, microwave oven, stove, dishwasher, washer, dryer, and the like; or utility equipment, which may include a garage door opening system, heating ventilation air conditioning (HVAC) equipment, indoor water equipment (water heater, water softener, water meter, fire alarm, in-home sprinkler system, etc.), telephony equipment, irrigation water equipment (lawn sprinkler system, etc.), natural gas system (carbon monoxide sensor, gas meter, gas detection system, etc.), and the like. In alternate embodiments, a user may input energy usage data and water usage data directly at the local computing device 115, 120 or at remote computing device 140, such that the waste score may be calculated based wholly or in part on user inputted data. For example, a user may enter water usage data into a dedicated application on his smart phone indicating water usage for the month as determined by a water meter linked to his home.

Data gathered by the one or more sensor units 110 may be communicated to local computing device 115, 120, which may be, in some embodiments, a thermostat or other wall-mounted input/output smart home display. In other embodiments, local computing device 115, 120 may be a personal computer or smart phone. Where local computing device 115, 120 is a smart phone, the smart phone may have a dedicated application directed to collecting energy usage data and water usage data and calculating a waste score therefrom. The local computing device 115, 120 may process the data received from the one or more sensor units 110 to obtain a waste score. In alternate embodiments, remote computing device 140 may process the data received from the one or more sensor units 110, via network 125 and server 130, to obtain a waste score. Data transmission may occur via, for example, frequencies appropriate for a personal area network (such as Bluetooth or IR communications) or local or wide area network frequencies such as radio frequencies specified by the IEEE 802.15.4 standard.

In any embodiment, energy usage data and water usage data collected from one or more sensor units 110 may be communicated to central database 135 via network 125 and server 130. Central database 135 may be located at, for example, a central security operations location, and may compile energy usage data and water usage data collected from a plurality of individual users, and may determine one or more user groups from the plurality of users based on predetermined parameters. For example, central database 135 may group users and corresponding user data into groups based on common house size or occupancy, or based on location, or a combination thereof. Central database 135 may then calculate average water usage and average energy usage among users in individual groups. Local computing device 115, 120 or remote computing device 140 may receive group-based resource usage data averages from central database 135 and may compare energy usage data and water usage data for the individual user collected from one or more sensor units 110 with the average energy usage data and average water usage data received from central database 135 in order to calculate waste scores for the individual user.

Sensor units 110 may collect energy usage data and water usage data at discrete intervals or an a continuous basis. Similarly, central database 135 may calculate average energy usage and average water usage from the plurality of users at discrete intervals or on a continuous basis.

In some embodiments, local computing device 115, 120 may communicate with remote computing device 140 or central database 135 via network 125 and server 130. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, a user may access the functions of local computing device 115, 120 from remote computing device 140. For example, in some embodiments, remote computing device 140 may include a mobile application that interfaces with one or more functions of local computing device 115, 120.

The server 130 may be configured to communicate with the sensor units 110, the local computing devices 115, 120, the remote computing device 140 and databases 135. The server 130 may perform additional processing on signals received from the sensor units 110 or local computing devices 115, 120, or may simply forward the received information to the remote computing device 140 and central database 135.

Server 130 may be a computing device operable to receive data streams (e.g., from sensor units 110 and/or local computing device 115, 120 or remote computing device 140), store and/or process data, and/or transmit data and/or data summaries (e.g., to remote computing device 140). For example, server 130 may receive a stream of energy usage data from a sensor unit 110, a stream of water usage data from the same or a different sensor unit 110, and a stream of natural gas usage data from either the same or yet another sensor unit 110. Based on corresponding resource usage data received, the server 130 may be able to calculate a waste score by comparing the monitored usage data with average usage data compiled at central database 135. In some embodiments, server 130 may "pull" the data streams, e.g., by querying the sensor units 110, the local computing devices 115, 120, and/or the central database 135. In some embodiments, the data streams may be "pushed" from the sensor units 110 and/or the local computing devices 115, 120 to the server 130. For example, the sensor units 110 and/or the local computing device 115, 120 may be configured to transmit data as it is generated by or entered into that device. In some instances, the sensor units 110 and/or the local computing devices 115, 120 may periodically transmit data (e.g., as a block of data or as one or more data points).

The server 130 may include a database (e.g., in memory) containing resource usage data received from the sensor units 110 and/or the local computing devices 115, 120. Additionally, as described in further detail herein, software (e.g., stored in memory) may be executed on a processor of the server 130. Such software (executed on the processor)

may be operable to cause the server 130 to monitor, process, summarize, present, and/or send a signal associated with resource usage data.

Figure 2:
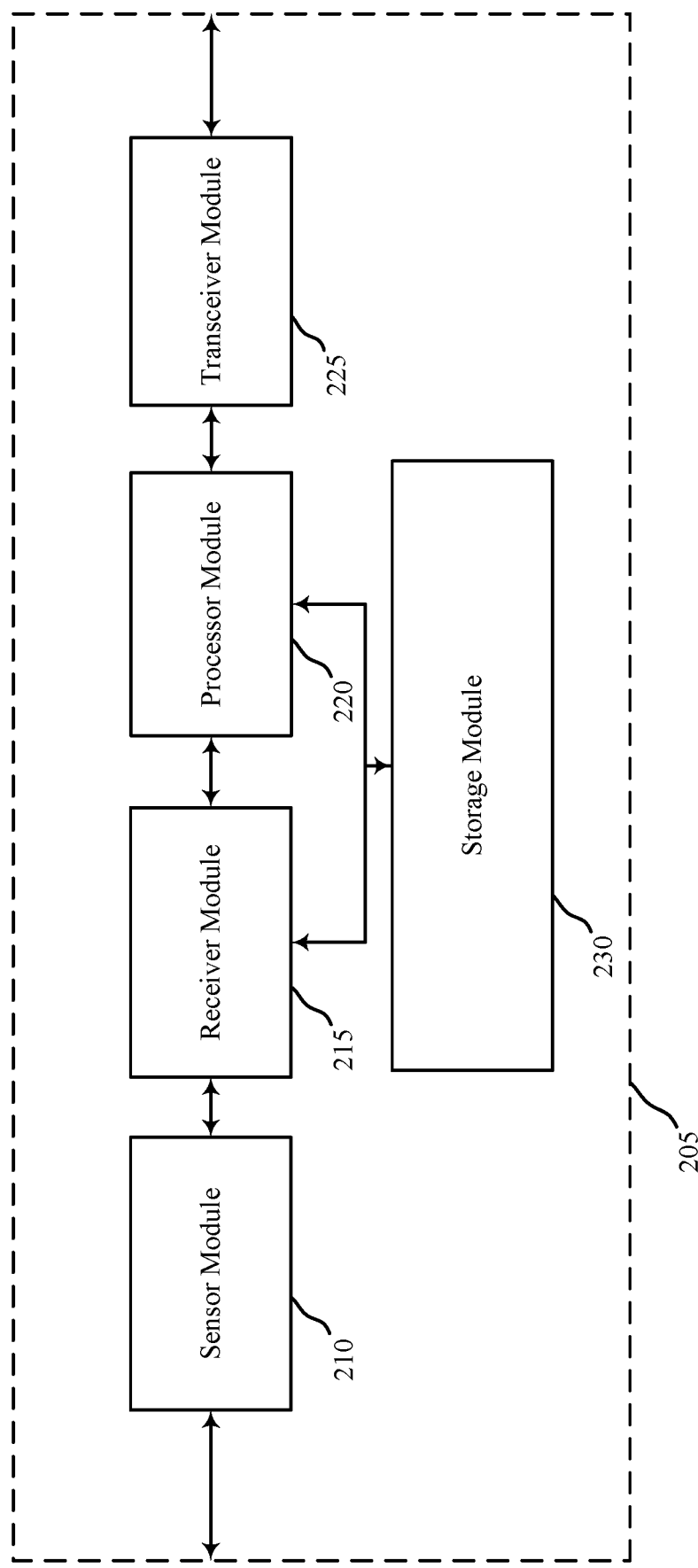
FIG. 2 is a block diagram illustrating one example of an apparatus in accordance with the system of FIG. 1.

FIG. 2 is a block diagram 200 that includes apparatus 205, which may be an example of one or more aspects of the local computing devices 115, 120 and/or remote computing device 140, or may alternatively be an example of one or more aspects of the sensor unit 110 (of FIG. 1), for use in energy usage and water usage data monitoring, in accordance with various aspects of the present disclosure. In some examples, the apparatus 205 may include a sensor module 210, receiver module 215, processor module 220, transceiver module 225, and storage module 230. Each of these components may be in communication with each other.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The sensor module 210 may be configured to monitor data relating to home water usage, electricity or energy usage, or any other home resource usage, wherein the data is received, at least in part, from one or more sensor units 110. In other embodiments, home resource usage data may be inputted directly at apparatus 205. For example, a user may input water usage data into a dedicated application on his smart phone or personal computer, or may enter the data into an interactive smart home panel.

The receiver module 215 may be configured to receive resource usage data for an individual user, collected by sensor module 210. In addition, receiver module 215 may receive average resource usage data from central database 135. As previously discussed, individual user resource usage data and average resource usage data may be collected on a continuous basis, or may be collected at discrete intervals.

Processor module 220 may be configured to compare average resource usage data collected from central database 135 at receiver module 215 with individual user resource usage data collected by sensor module 210 and received at receiver module 215 in order to determine a waste score for an individual user. For example, processor module may collect water usage data from an individual user and compare the water usage data to average water usage data for a group of users as determined by central database 135 in order to determine a water usage waste score. Processor module 220 may then collect energy usage data from an individual user and compare the energy usage data to average energy usage data for a group of users as determined by central database 135 in order to determine an energy usage waste score. Finally, processor module 220 may average the calculated water usage waste score and calculated energy usage waste score in order to determine a general waste score for the individual user. In some embodiments, processor module 220 may update the individual resource usage waste scores and general waste score on an ongoing basis as updated resource usage data is collected by sensor module 210 and communicated to processor module 220 via receiver module 215. In this way, an individual user may know immediately what the waste score ramifications are of his adjusting, for example, his thermostat level. In other embodiments, processor module 220 may update sub-waste scores (discussed in more detail below) and general waste score at predetermined, discrete intervals. In the latter instance, resource usage data gathered by sensor module 210 and communicated to receiver module 215 may be stored in storage module 230 until such time as processor module 220 is configured to calculate waste score values.

In embodiments where apparatus 205 comprises one or more sensor units 110 or local computing device 115, 120, transceiver module 225 may be operable to transmit the calculated waste scores to the individual user at, for example, remote computing device 140. In other embodiments, the calculated waste scores may be communicated to the individual user via transceiver module 225 to a smart home panel.

In some examples, apparatus 205 may be operable to receive data streams from the sensor units 110, as well as to send and/or receive other signals between the sensor units 110 and either the local computing devices 115, 120 or the remote computing device 140 via the network 125 and server 130. In one embodiment, apparatus 205 may receive data streams from the sensor units 110 and also forward the data streams to other devices. Apparatus 205 may include wired and/or wireless connectors. For example, in some embodiments, sensor units 110 may be portions of a wired or wireless sensor network, and may communicate with the local computing devices 115, 120 and/or remote computing device 140 using either a wired or wireless network. Apparatus 205 may be a wireless network interface controller ("NIC"), Bluetooth® controller, IR communication controller, ZigBee® controller and/or the like. In alternate embodiments, apparatus 205 may be a component of one or more sensor units 110 such that home resource usage data received at one or more sensor units 110 may be processed by apparatus 205 at the one or more sensor units 110, and may be either displayed or translated into a waste score at apparatus 205, or alternatively may be transmitted to either the local computing devices 115, 120 or the remote computing device 140 via the network 125 and server 130 for translation into a waste score.

In some examples, apparatus 205 may include circuitry, logic, hardware and/or software for processing the data streams received from the sensor units 110. Apparatus 205 may include filters, analog-to-digital converters and other digital signal processing units. Data processed by a signal processing module may be stored in a buffer, for example, in a storage module. The storage module may include magnetic, optical or solid-state memory options for storing data processed by the signal processing module.

Figure 3:
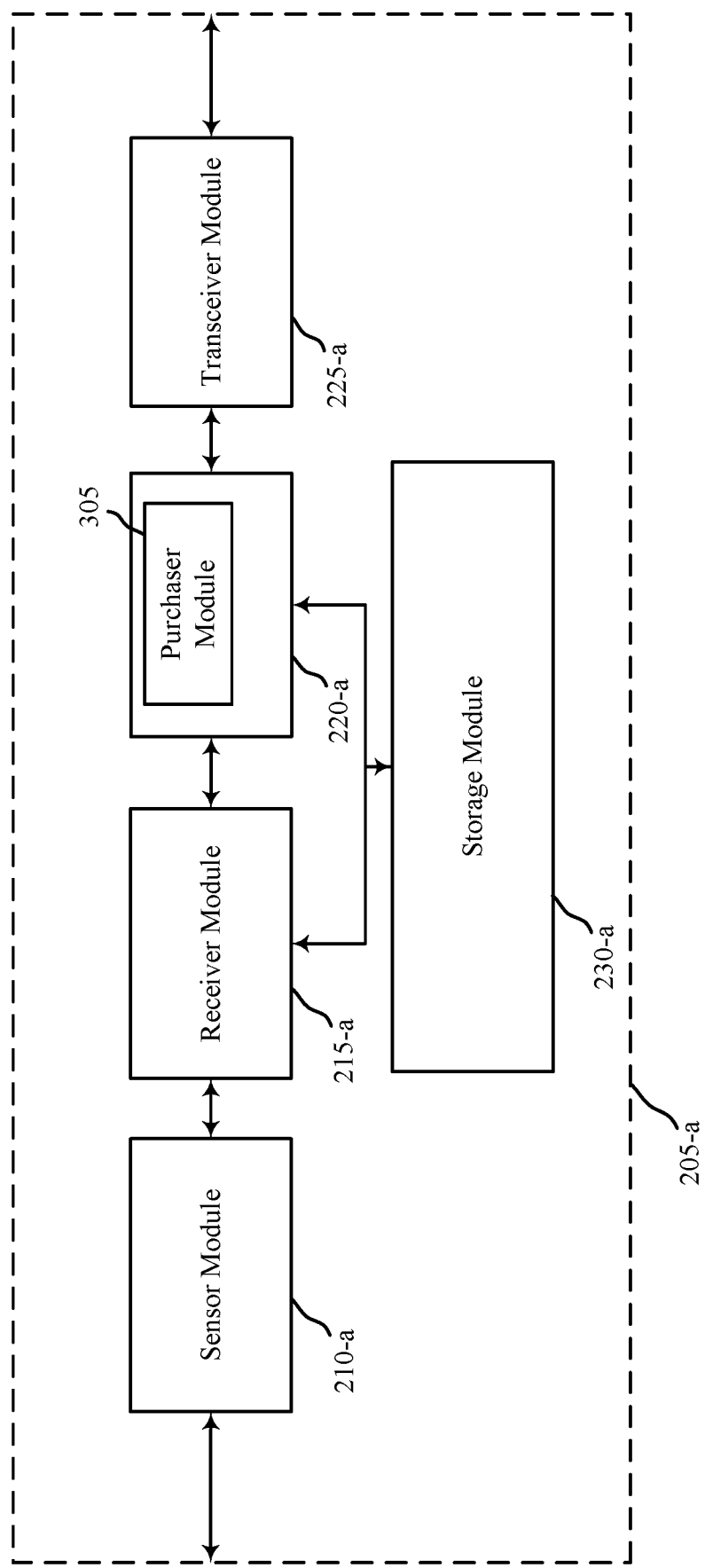
FIG. 3 is a block diagram illustrating another example of an apparatus in accordance with the system of FIG. 1.

FIG. 3 is a block diagram illustrating an example of apparatus 205-a, which may be an example of one or more aspects of apparatus 205 (of FIG. 2), which may in turn be an example of one or more aspects of the local computing devices 115, 120 and/or remote computing device 140, or may alternatively be an example of one or more aspects of the sensor unit 110 (of FIG. 1), for use in energy usage and water usage data monitoring, in accordance with various aspects of the present disclosure. In some examples, apparatus 205-a may include a sensor module 210-a, receiver module 215-a, processor module 220-a comprising a purchaser module 305, transceiver module 225-a, and storage module 230-a. Each of these components may be in communication with each other.

Sensor module 210-a, receiver module 215-a, processor module 220-a, transceiver module 225-a, and storage module 230-*a* may be operable in the same manner as described above with respect to FIG. 2. In apparatus 205-*a* of FIG. 3, however, processor module 220-*a* may additionally comprise purchaser module 305, which may be operable to link calculated user waste scores to new appliance or fixture purchases. For example, processor module 220-*a* may calculate, based on energy usage data collected at sensor module 210-*a* and communicated to processor module 220-*a* via receiver module 215-*a*, an energy usage waste score for the individual user by comparing the individual user's energy usage data to average energy usage data collected from central database 135. On the basis of the calculated energy usage waste score, processor module 220-*a* may determine that the individual user's washing machine is consuming more energy than that of average users' washing machines, and may provide this information to purchaser module 305. Purchaser module 305 may be linked, for example by an Internet connection, to a plurality of appliance suppliers, and may provide information to the user regarding purchasing options and prices for new washing machines. By accessing this information at, for example, his smart home panel or dedicated application on his smart phone, the user may elect to purchase a new washing machine. Purchaser module 305 may facilitate this purchase through a link to the appliance supplier.

Figure 4:
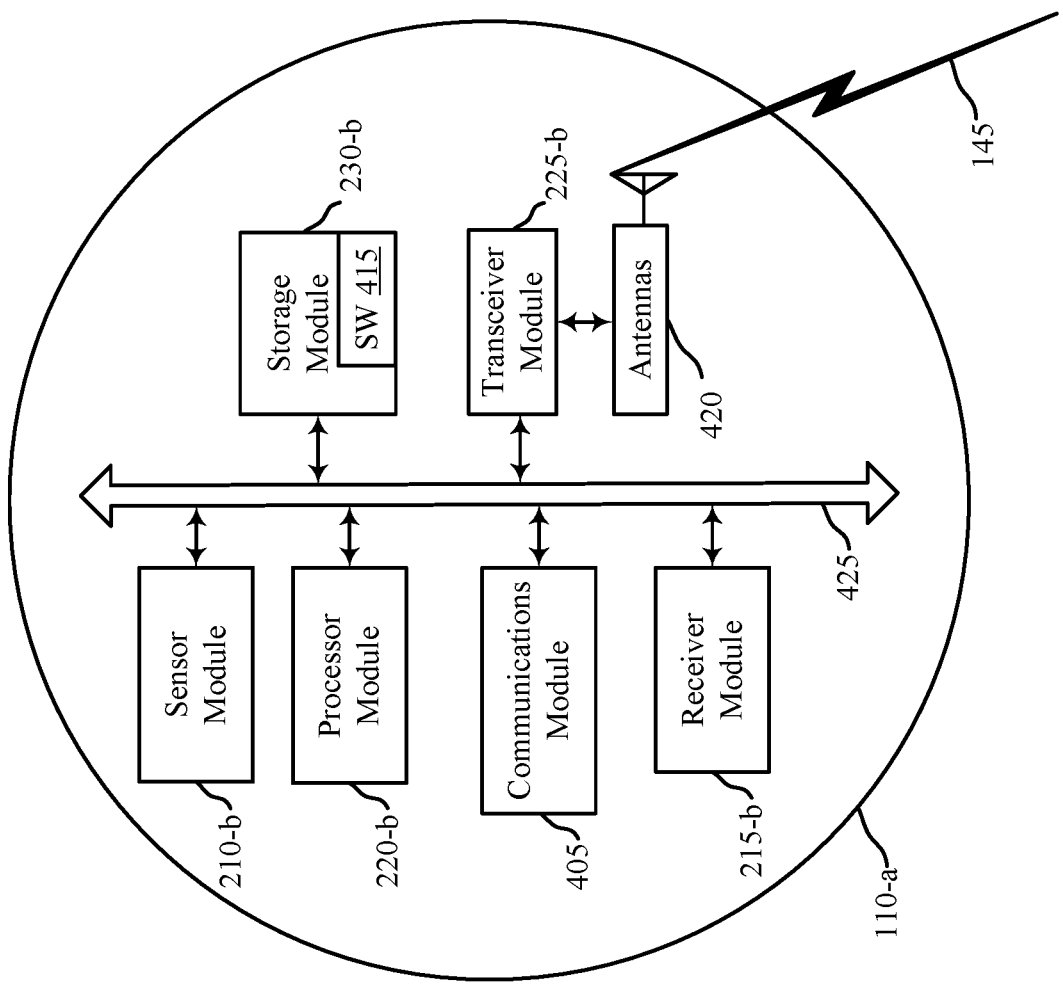
FIG. 4 is a block diagram illustrating one example of a sensor module in accordance with the system of FIG. 1.

FIG. 4 shows a block diagram 400 of a sensor unit 110-*a* for use in monitoring resource usage in accordance with various aspects of the present disclosure. The sensor unit 110-*a* may have various configurations. The sensor unit 110-*a* may, in some examples, have an internal power supply (not shown), such as a small battery, to facilitate mobile operation. In some examples, the sensor unit 110-*a* may be an example of one or more aspects of one of the sensor units 110 and/or apparatus 205, 205-*a* described with reference to FIGS. 1, 2, and/or 3, and may be configured to implement at least some of the features and functions described.

The sensor unit 110-*a* may include a sensor module 210-*b*, processor module 220-*b*, communications module 405, receiver module 215-*b*, at least one transceiver module 225-*b*, at least one antenna (represented by antennas 420), and storage module 230-*b*. Each of these components may be in communication with each other, directly or indirectly, over one or more buses 425. The sensor module 210-*b*, processor module 220-*b*, receiver module 215-*b*, storage module 230-*b*, and transceiver module 225-*b* may be examples of the sensor module 210, processor module 220, receiver module 215, storage module 230, and transceiver module 225, respectively, of FIG. 2.

The storage module 230-*b* may include random access memory (RAM) or read-only memory (ROM). The storage module 230-*b* may store computer-readable, computer-executable software (SW) code 415 containing instructions that are configured to, when executed, cause the processor module 220-*b* to perform various functions described herein for communicating resource usage data, for example. Alternatively, the software code 415 may not be directly executable by the processor module 220-*b* but may be configured to cause the sensor unit 110-*a* (e.g., when compiled and executed) to perform various of the functions described herein.

The processor module 220-*b* may include an intelligent hardware device, e.g., a CPU, a microcontroller, an ASIC, etc. The processor module 220-*b* may process information received through the transceiver module 225-*b* or information to be sent to the transceiver module 225-*b* for transmission through the antenna 420. The processor module 220-*b* may handle various aspects of signal processing as well as calculating individual waste scores based on received individual resource usage data and average resource usage data.

The transceiver module 225-*b* may include a modem configured to modulate packets and provide the modulated packets to the antennas 420 for transmission, and to demodulate packets received from the antennas 420. The transceiver module 225-*b* may, in some examples, be implemented as one or more transmitter modules and one or more separate receiver modules. The transceiver module 225-*b* may support waste score-related communications. The transceiver module 225-*b* may be configured to communicate bi-directionally, via the antennas 420 and communication link 145, with, for example, local computing devices 115, 120 and/or the remote computing device 140 (via network 125 and server 130 of FIG. 1). Communications through the transceiver module 225-*b* may be coordinated, at least in part, by the communications module 405. While the sensor unit 110-*a* may include a single antenna 420, there may be examples in which the sensor unit 110-*a* may include multiple antennas 420.

As examples, the transceiver module 225-*b* may include a Bluetooth® module, an IEEE 802.15.4 module with custom stack, a ZigBee® module, a wireless network interface controller (NIC), a cellular telephone module, and/or any other suitable module configured to send signals. The transceiver module 225-*b* may be operable to send a signal, for example over a network, the Internet, a cellular telephone link, and/or any other suitable communication means. In some embodiments, the transceiver module 225-*b* may include a short-range transmitter, for example, having a range of less than approximately 1000 feet.

Figure 5:
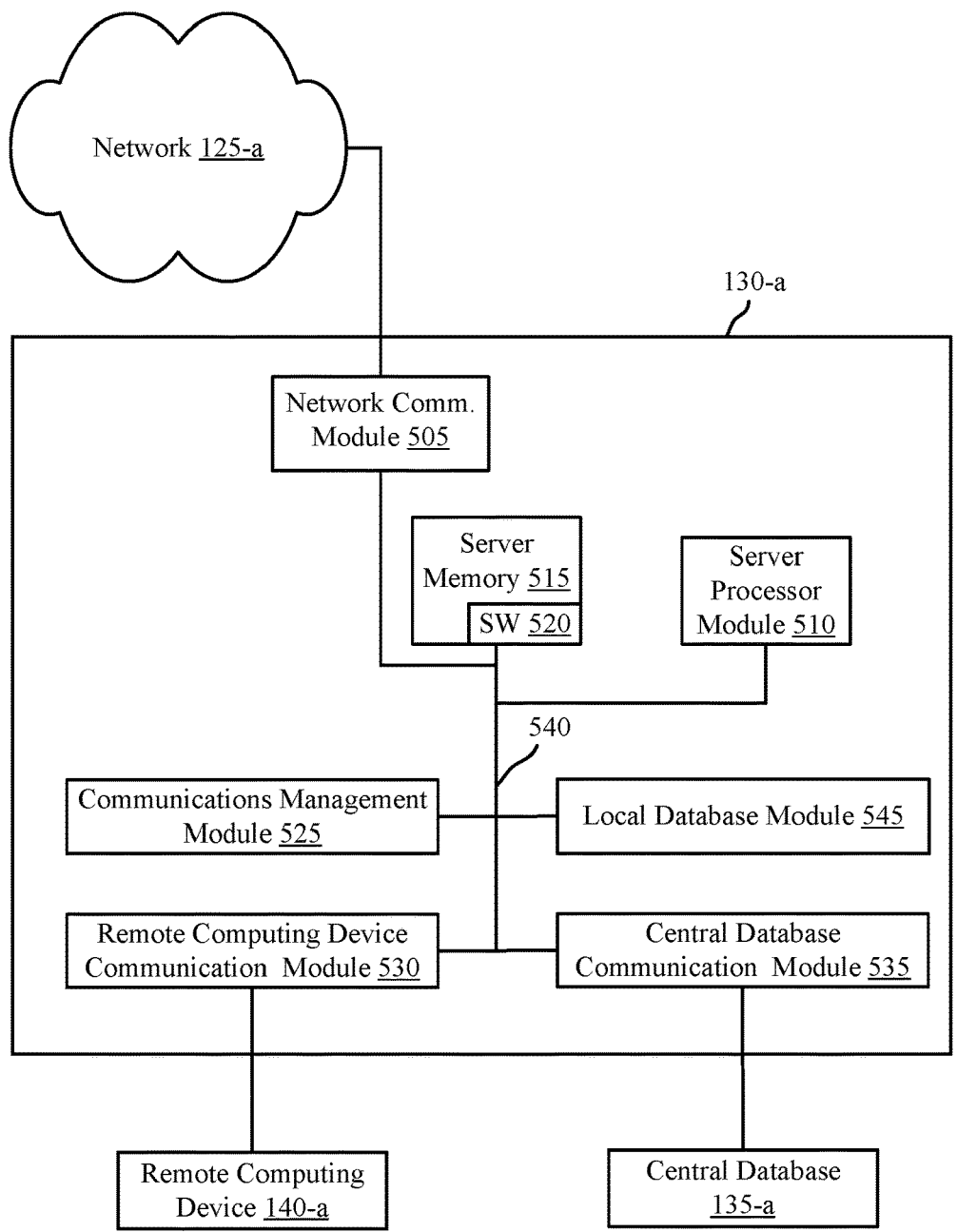
FIG. 5 is a block diagram illustrating one example of a server in accordance with the system of FIG. 1.

FIG. 5 shows a block diagram 500 of a server 130-*a* for use in determining waste scores based on monitored resource usage data, in accordance with various aspects of the present disclosure. In some examples, the server 130-*a* may be an example of aspects of the server 130 described with reference to FIG. 1. In other examples, the server 130-*a* may be implemented in either the local computing devices 115, 120 or the remote computing device 140 of FIG. 1. The server 130-*a* may be configured to implement or facilitate at least some of the features and functions described with reference to the server 130, the local computing devices 115, 120 and/or the remote computing device 140 of FIG. 1.

The server 130-*a* may include a server processor module 510, a local database module 545, and/or a communications management module 525. The server 130-*a* may also include one or more of a network communication module 505, a remote computing device communication module 530, and/or a central database communication module 535. Each of these components may be in communication with each other, directly or indirectly, over one or more buses 540.

The server processor module 510 may include an intelligent hardware device, e.g., a central processing unit (CPU), a microcontroller, an ASIC, etc. The server processor module 510 may process information received through the one or more communication modules 505, 530, 535. The server processor module 510 may also process information to be sent to the one or more communication modules 505, 530, 535 for transmission. Communications received at or transmitted from the network communication module 505 may be received from or transmitted to sensor units 110, or local computing devices 115, 120, via network 125-*a*, which may be an example of the network 125 described in relation to FIG. 1. Communications received at or transmitted from the remote computing device communication module 530 may be received from or transmitted to remote computing device 140-*a*, which may be an example of the remote computing device 140 described in relation to FIG. 1. Communications received at or transmitted from the central database communication module 535 may be received from or transmitted to central database 135-*a*, which may be an example of the central database 135 described in relation to FIG. 1. Additionally, a local database may be accessed and stored at the server 130-*a*. The local database module 545 may be used to access and manage the local database, which may include data received from the sensor units 110, the local computing devices 115, 120, or the remote computing devices 140 (of FIG. 1).

Figure 6:
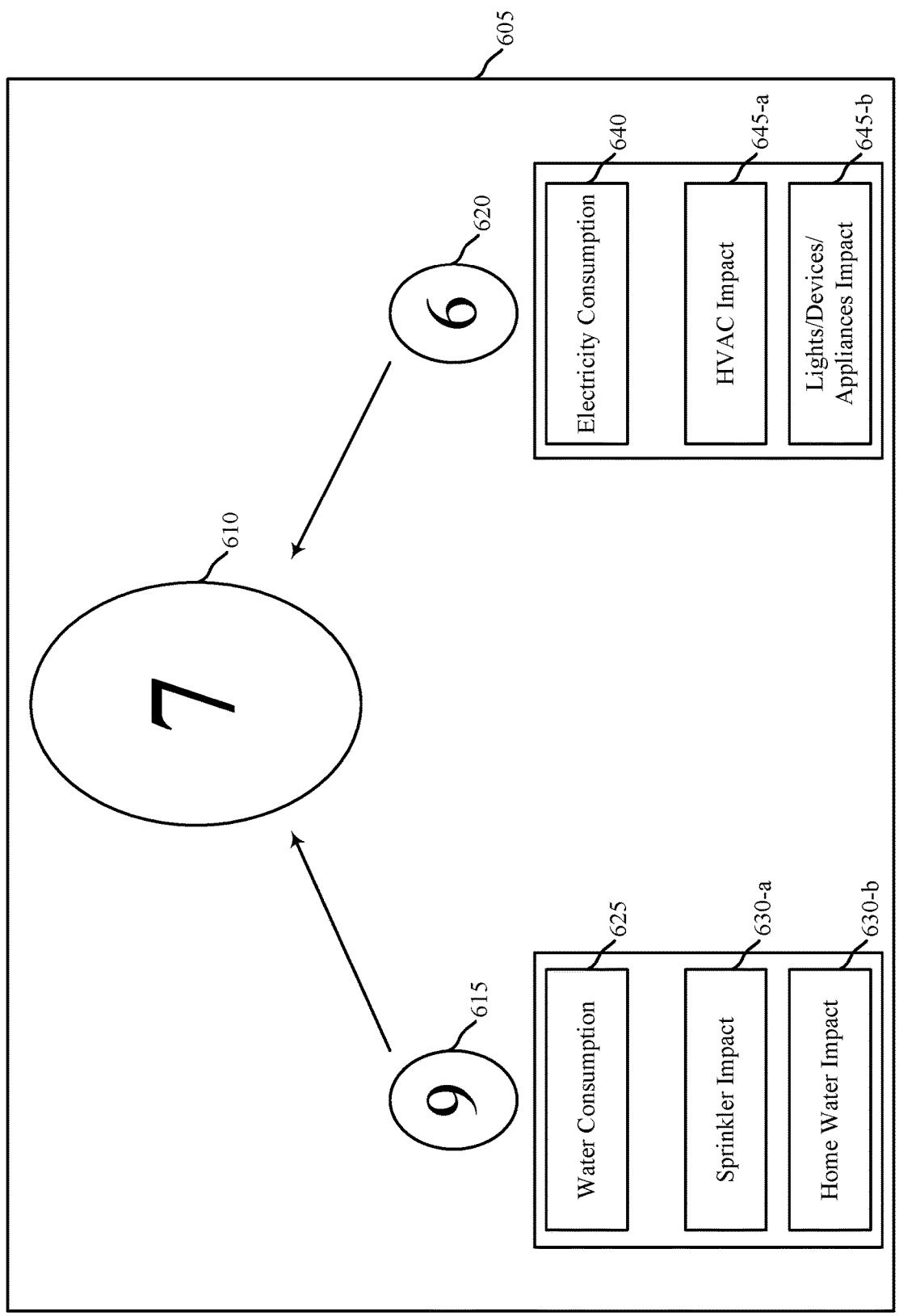
FIG. 6 is a block diagram illustrating one example of a waste score display in accordance with various embodiments.

FIG. 6 is a block diagram 600 illustrating one embodiment of a display 605 of calculated waste scores. In some embodiments, the display 605 may appear on a local computing device 115, 120, wherein the local computing device 115, 120 may be any one or more of a personal computer, a smart phone, or a smart home panel. In other embodiments, the display 605 may appear on a remote computing device 140.

In the illustrated embodiment, a general waste score 610 of 7 has been calculated for the user, and may be included on the display 605. As previously discussed, the general waste score 610 may be calculated by collecting energy usage data, water usage data, and any other relevant resource usage data from an individual user. The collected resource usage data may then be compared with resource usage data averages collected and compiled by central database 135 (of FIG. 1), such that resource usage data may be compared between users having similar home sizes, occupancies, locations, etc. The compared resource usage data may then be translated into a general waste score 610, indicating an average of sub-waste scores 615, 620 calculated based on individual resource usage data. In the illustrated example, the user has received a general waste score 610 of 7, out of a possible 10, where a waste score of 1 is a good waste score, and a waste score of 10 is a bad waste score. In other embodiments, the waste score may be calculated on any other appropriate scale.

The display 605 may further indicate a plurality of sub-waste scores 615, 620 indicating a user's waste scores representing each of a plurality of factors of energy usage and factors of water usage. For example, in the illustrated embodiment, the user is awarded a sub-waste score 615 of 9 for his water consumption 625, and a sub-waste score 620 of 6 for his electricity consumption 640. As previously mentioned, the average of the two or more sub-waste scores 615, 620 is equal to the general waste score 610 for the user.

Each sub-waste score 615, 620 may further be broken down into factors of sub-waste score usage, for example sprinkler impact 630-*a* and home water impact 630-*b* for the water consumption 625 sub-waste score 615, and HVAC impact 645-*a* and lights/devices/appliances impact 645-*b* for electricity consumption 640 sub-waste score 620. Though not shown in FIG. 6, further sub-waste scores may include natural gas usage and the like. Additional sub-waste score factors are also envisioned.

In some embodiments, the display 605 may be interactive, such that the user may select factors 630-*a*, 630-*b*, 645-*a*, 645-*b* of sub-waste scores 615, 620 in order to display further information regarding the user's resource consumption. For example, a user may select the sprinkler impact factor 630-*a* to show information (not shown) detailing the water usage of the user's sprinklers as compared to other users', and suggesting adjustments to improve upon the water consumption sub-waste score 615. In some embodiments, the display 605 may suggest implementing alternate watering schedules, or may suggest purchasing a replacement sprinkler system having improved water usage parameters. In some embodiments, the display 605 may provide a means to purchase the suggested replacement sprinkler system directly at the display 605 via a link to participating distributers.

In addition, in some embodiments, display 605 may include gamification aspects of waste score reporting. For example, display 605 may display to the user how his waste score compares to his friends' via a social network link, and may provide motivation for the user to improve upon his waste score in order to "beat" his friends. In some embodiments, users may be rewarded, for example with coupons, credits, virtual currency, or status for improving upon their waste scores or for achieving superior waste scores over their friends.

Figure 7:
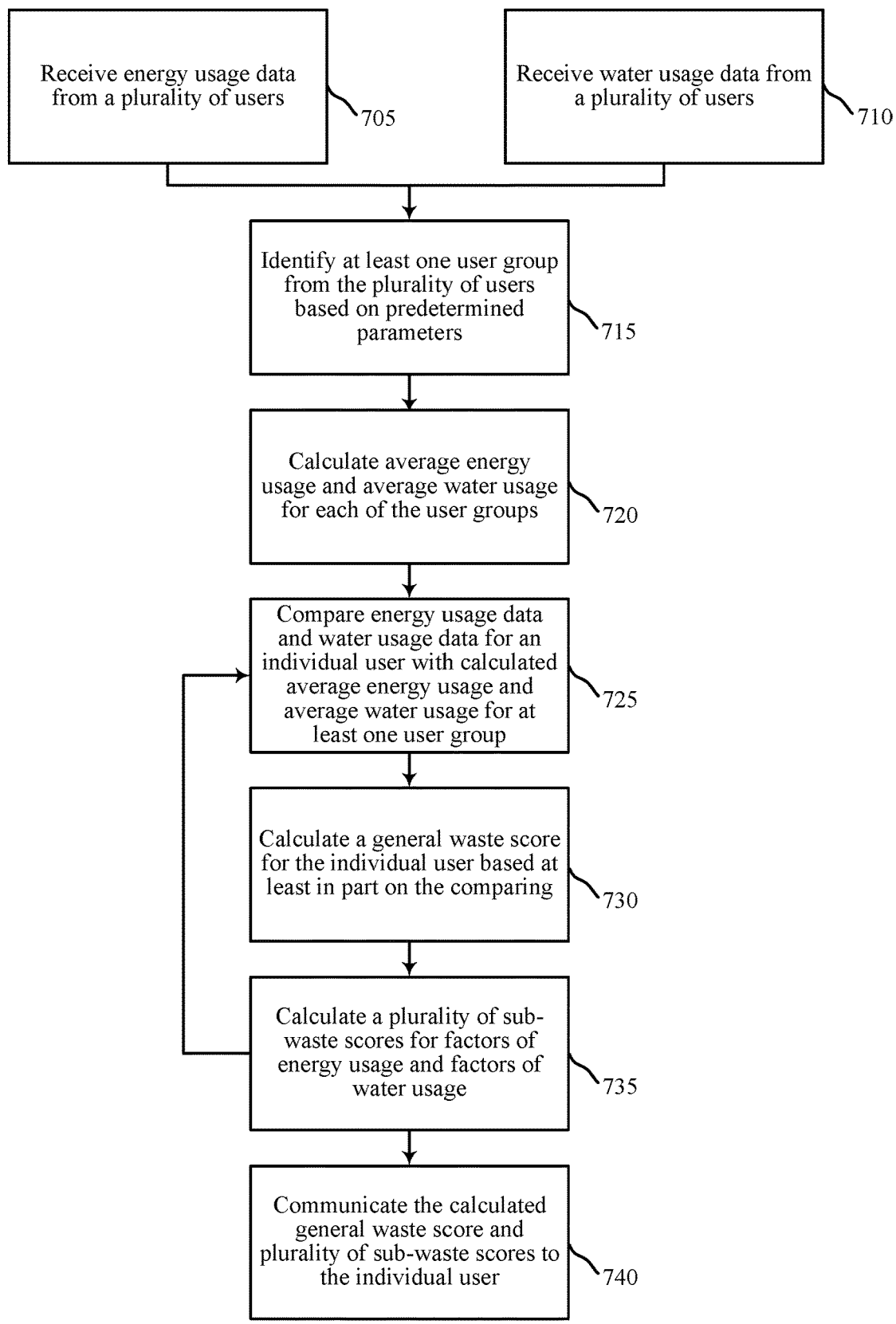
FIG. 7 is a flow diagram illustrating one embodiment of a method for correlating energy usage data and water usage data to a waste scoring system.

FIG. 7 is a flow diagram illustrating one embodiment of a method 700 for correlating energy usage data and water usage data to a waste scoring system. In some configurations, the method 700 may be implemented by the waste scoring system 100 of FIG. 1. In some configurations, method 700 may be implemented in conjunction with the apparatus 205, 205-*a* or sensor unit 110-*a* of FIGS. 2-4.

At block 705, the method 700 may comprise receiving energy usage data from a plurality of users. As previously discussed, energy usage data may be compiled at a central database in order to track resource usage data for a plurality of users. At block 710, the method 700 may further comprise receiving water usage data from a plurality of users, which may similarly be compiled at the central database. Energy usage data and water usage data may be collected on a continual basis, or may be collected at discrete intervals. In some embodiments, additional resource usage data may be collected, for example data pertaining to natural gas usage, or the like.

At block 715, method 700 may comprise identifying at least one user group from the plurality of users based on predetermined parameters. The predetermined parameters may comprise home or other property size, occupancy, geographical location, etc. The grouping may be updated on a continual basis, or may be updated at discrete intervals. Thus, as home or other property owners remodel their homes, grow or decrease in occupancy, or the like, user grouping may be updated to coincide with these changes.

At block 720, method 700 may comprise calculating average energy usage and average water usage for each of the user groups. As with the collection of the energy usage data and the water usage data, the average energy usage and average water usage calculation may be updated on a continual basis as new data is received, or may be updated at predetermined intervals.

At block 725, method 700 may comprise comparing energy usage data and water usage data for an individual user with calculated average energy usage and average water usage for at least one user group. As previously discussed, energy usage data and water usage data may be collected for an individual user via one or more sensor units coupled or integrated with a plurality of home appliances, systems, or fixtures. Alternatively, energy usage data and water usage data may be inputted directly by the individual user at, for example, a smart home panel or in a dedicated application on the user's smart phone. Collected energy usage data and water usage data may then be compared to the calculated average energy usage and average water usage for the one or more user groups which coincide with the demographics of the individual user. For example, the individual user's resource usage data may be compared to average resource usage data for a group of users having the same home size. Alternatively or in addition, the individual user's resource usage data may be compared to average resource usage data for a group of users having the same home occupancy.

At block 730, method 700 may comprise calculating a general waste score for the individual based, at least in part, on the comparing of the individual user's resource usage data to average resource usage data of the one or more user groups having coinciding demographics. At block 735, method 700 may comprise calculating a plurality of sub-waste scores for factors of energy usage and factors of water usage. For example, a sub-waste score may be calculated representing the individual user's water usage, and a plurality of further sub-waste scores may be calculated representing factors contributing to the individual user's water usage, such as home water use and sprinkler use. The general waste score may be representative of an average of the calculated sub-waste scores.

As shown in FIG. 7, at block 735, method 700 may comprise repeating the steps shown in blocks 725, 730, and 735 a plurality of times. This is because, as additional individual user energy usage data and water usage data is received, the general waste score and plurality of sub-waste scores may be updated. In addition, as additional energy usage data and water usage data is collected for a plurality of users, the average energy usage and average water usage for each of the user groups may also be updated. Thus, the general waste score and plurality of sub-waste scores for an individual user may be updated on a continual basis, or may be updated at discrete intervals.

At block 740, method 700 may comprise communicating the calculated general waste score and plurality of sub-waste scores to the individual user. The calculated general waste score and plurality of sub-waste scores may be communicated to the individual user at discrete intervals, or may delivered on a continual basis such that users may receive their waste scores in real-time. The calculated waste scores may be delivered to the user at a local computing device 115, 120 or remote computing device 140. In some embodiments, local computing device 115, 120 may include a dedicated application on the user's smart phone, or may include a smart home panel.

In another embodiment not shown, a waste score may be calculated for an individual user based on garbage receptacle usage data. The method may comprise receiving garbage receptacle usage data from a plurality of users. In some embodiments, the garbage receptacle usage data may comprise data received from an optical sensor on the lid of the garbage receptacle, such that the frequency with which the lid is opened (and correspondingly, the frequency with which garbage is deposited into the receptacle) may be monitored. In other embodiments, the garbage receptacle usage data may comprise data collected from a weighing mechanism placed under or integrated into the garbage receptacle, such that the weight of the contents of the garbage receptacle may be measured in order to determine users' garbage production. The garbage receptacle usage data may be communicated from the one or more sensor units to any of a local computing device or remote computing device, and may be compiled at a central database.

From the plurality of users, the method may comprise identifying at least one user group based on predetermined parameters. As previously discussed, the predetermined parameters may comprise any one or more of home size, occupancy, and location data. The method may further comprise calculating average garbage receptacle usage for each of the user groups, the average garbage receptacle usage being calculated based, at least in part, on the garbage receptacle usage data received from the plurality of users. Average garbage receptacle usage may be calculated at discrete intervals, or may be updated continuously based on received garbage receptacle usage data for the plurality of users.

The method may further comprise comparing garbage receptacle usage data for an individual user with the calculated average garbage receptacle usage for one or more of the user groups. Based, at least in part, on this comparing, the method may comprise calculating a general waste score for the individual user. In this way, an individual user may compare his own waste production with that of other users having common demographics, such as home size or occupancy. The calculated waste score may be communicated to the individual user via any one or more of a personal computer, a dedicated application on a smart phone, or on a display of a smart home panel. The display indicating the individual user's waste score may provide additional information to the user and suggestions for improving his waste score, for example by recycling or composting, or by using reusable dishware and containers or water bottles. The individual waste score may be updated at regular intervals, or on a continual basis, as updated individual garbage receptacle usage data is collected for the individual user, and as the average garbage receptacle usage is updated based on data collected from the plurality of users.

In some embodiments, individual users may interact with other users, for example on a dedicated application or webpage, in order to challenge each other to improve their waste scores, or to share suggestions for improving waste scores. This interaction may be integrated into existing social networking platforms, or may be performed on dedicated platforms.

Regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purposes of explanation, has been described with reference to specific embodiments. However, the illustrative discussions above are not intended to be exhaustive nor to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for a waste scoring system of a home at a local computing device, comprising:
    receiving, by an antenna of the local computing device, data from a plurality of sensors each measuring an appliance or system of the home;
    calculating a general waste score for the home based at least in part on the receiving;
    determining an impact factor associated with each of a plurality of appliances or systems of the home, wherein each impact factor indicates a resource usage impact of one of the plurality of appliances or systems on the general waste score for the home;
    determining, based at least in part on determining the impact factor associated with each of the plurality of appliances, that one appliance or system of the plurality of appliances or systems consumes more energy than an average appliance or system;
    receiving, from a supplier via an Internet connection based at least in part on determining that the one appliance or system consumes more energy than the average appliance or system, purchasing information to facilitate a purchase of a replacement appliance or system that consumes less energy than the one appliance or system of the plurality of appliances or systems; and
    transmitting, by the antenna of the local computing device, the calculated general waste score, the determined impact factors associated with each of the plurality of appliances or systems, and the purchasing information.

2. The method of claim 1, further comprising:
    receiving average resource usage data from a database, wherein calculating the general waste score for the home is based at least in part on the average resource usage data.

3. The method of claim 2, further comprising:
    comparing the data from the plurality of sensors to the average resource usage data, wherein the general waste score indicates a relationship between the data from the plurality of sensors and the average resource usage data.

4. The method of claim 2,
    wherein determining that the one appliance or system consumes more energy than the average appliance or system is based at least in part on receiving the average resource usage data from the database.

5. The method of claim 1, wherein the general waste score is associated with an energy usage and a water usage of the home.

6. The method of claim 1, wherein the transmitting further comprises transmitting the calculated general waste score and the determined impact factors associated with each of the plurality of appliances or systems to a wall-mounted control panel of the home, a personal computer, a dedicated application, a webpage, a smart phone, or a combination thereof.

7. The method of claim 1, further comprising:
    calculating a plurality of sub-waste scores for the home, wherein an average of the plurality of sub-waste scores is equal to the general waste score.

8. The method of claim 1, wherein receiving data further comprises receiving data continuously from the plurality of sensors.

9. The method of claim 1, wherein the plurality of appliances or systems comprise a heating ventilation air conditioning (HVAC) system, sprinkler system, water heater, natural gas system, wall plug, refrigerator, oven, microwave oven, stove, dishwasher, washer, or dryer.

10. An apparatus for a waste scoring system of a home, comprising:
    a receiver operable to receive data from a plurality of sensors each measuring an appliance or system of the home; and
    a processor operable to:
        calculate a general waste score for the home based at least in part on the receiving;
        determine an impact factor associated with each of a plurality of appliances or systems of the home, wherein each impact factor indicates a resource usage impact of one of the plurality of appliances or systems on the general waste score for the home;
        determine, based at least in part on determining the impact factor associated with each of the plurality of appliances, that one appliance or system of the plurality of appliances or systems consumes more energy than an average appliance or system;
        receive, from a supplier via an Internet connection based at least in part on determining that the one appliance or system consumes more energy than the average appliance or system, purchasing information to facilitate a purchase of a replacement appliance or system that consumes less energy than the one appliance or system of the plurality of appliances or systems; and transmit the calculated general waste score, the determined impact factors associated with each of the plurality of appliances or systems, and the purchasing information.

11. The apparatus of claim 10, wherein the processor is further operable to receive average resource usage data from a database, wherein calculating the general waste score for the home is based at least in part on the average resource usage data.

12. The apparatus of claim 11, wherein the processor is further operable to compare the data from the plurality of sensors to the average resource usage data, wherein the general waste score indicates a relationship between the data from the plurality of sensors and the average resource usage data.

13. The apparatus of claim 11, wherein
determining that the one appliance or system consumes more energy than the average appliance or system is based at least in part on receiving the average resource usage data from the database.

14. The apparatus of claim 10, wherein the general waste score is associated with an energy usage and a water usage of the home.

15. The apparatus of claim 10, wherein the transmitting further comprises transmitting the calculated general waste score and the determined impact factors associated with each of the plurality of appliances or systems to a wall-mounted control panel of the home, a personal computer, a dedicated application, a webpage, a smart phone, or a combination thereof.

16. The apparatus of claim 10, wherein the processor is further operable to calculate a plurality of sub-waste scores for the home, wherein an average of the plurality of sub-waste scores is equal to the general waste score.

17. The apparatus of claim 10, wherein receiving data further comprises receiving data continuously from the plurality of sensors.

18. A non-transitory computer-readable medium storing computer-executable code at a local computing device, the code executable by a processor to:

receive, by an antenna of the local computing device, data from a plurality of sensors each measuring an appliance or system of a home;

calculate a general waste score for the home based at least in part on the receiving;

determine an impact factor associated with each of a plurality of appliances or systems of the home, wherein each impact factor indicates a resource usage impact of one of the plurality of appliances or systems on the general waste score for the home;

determine, based at least in part on determining the impact factor associated with each of the plurality of appliances, that one appliance or system of the plurality of appliances or systems consumes more energy than an average appliance or system;

receive, from a supplier via an Internet connection based at least in part on determining that the one appliance or system consumes more energy than the average appliance or system, purchasing information to facilitate a purchase of a replacement appliance or system that consumes less energy than the one appliance or system of the plurality of appliances or systems; and transmit the calculated general waste score, the determined impact factors associated with each of the plurality of appliances or systems, and the purchasing information.

19. The non-transitory computer-readable medium of claim 18, the code further executable by the processor to receive average resource usage data from a database, wherein calculating the general waste score for the home is based at least in part on the average resource usage data.

20. The non-transitory computer-readable medium of claim 18, wherein the general waste score is associated with an energy usage and a water usage of the home.

\* \* \* \* \*